United States Patent [19]

Dillard

[11] Patent Number: 4,594,760
[45] Date of Patent: Jun. 17, 1986

[54] APPARATUS FOR AND METHOD OF PACKAGING AND INSERTING AN ENGINE CYLINDER ASSEMBLY INTO AN ENGINE BLOCK

[75] Inventor: Harvey G. Dillard, Princeville, Ill.
[73] Assignee: Caterpillar Tractor Co., Peoria, Ill.
[21] Appl. No.: 713,362
[22] Filed: Mar. 18, 1985
[51] Int. Cl.$^4$ .............. B23P 15/00; B65B 61/00; B65D 85/68; B66C 1/00
[52] U.S. Cl. .............. 29/156.4 WL; 29/156.5 R; 29/283; 29/434; 29/559; 53/397; 53/413; 92/128; 123/193 R; 206/319; 294/90
[58] Field of Search .............. 29/156.4 WL, 156.5 R, 29/282, 283, 428, 434, 559; 53/396, 397, 413; 92/128; 123/193 C, 193 P, 198 R; 138/89 R, 97; 206/318, 319, 335; 294/90

[56] References Cited

U.S. PATENT DOCUMENTS 4,316,316 2/1982 Kappenhagen .............. 29/428 X
4,480,368 11/1984 Vachon .............. 29/156.4 WL

FOREIGN PATENT DOCUMENTS 395618 of 0000 France .............. 294/90

Primary Examiner—Mark Rosenbaum
Assistant Examiner—Ronald S. Wallace
Attorney, Agent, or Firm—Sterling R. Booth, Jr.

[57] ABSTRACT

Prepackaging the various components of an engine cylinder assembly as an exchange or overhaul kit is useful in servicing or overhauling a single cylinder of a multiple cylinder engine. The heretofore known devices for holding the components of the engine cylinder assembly together were primarily used with small engines where the weight of the components was sufficiently low so as to not cause any handling difficulties. The subject apparatus includes a pair of brackets which positively grippingly engage the flange of the cylinder liner and a lifting element which is releasably attached to the piston with bolts threaded into threaded holes in the piston such that a portion of the brackets is sandwiched between the lifting element and the piston. The apparatus is positively engaged with the components of the engine cylinder assembly and positively maintains the components in fixed relationship with one another. Thus, the apparatus is particularly useful in packaging engine cylinder assemblies for large engines and facilitates the use of a hoist for handling the engine cylinder assemblies with little chance of slippage between the piston and the cylinder liner.

7 Claims, 3 Drawing Figures

APPARATUS FOR AND METHOD OF PACKAGING AND INSERTING AN ENGINE CYLINDER ASSEMBLY INTO AN ENGINE BLOCK

DESCRIPTION

1. Technical Field

This invention relates generally to an engine cylinder assembly which includes a cylinder liner, a piston, rings, and a connecting rod and more particularly to an apparatus and method of packaging the cylinder assembly for subsequent installation as a unit into a cylinder bore of an engine block.

2. Background Art

Recently some engine manufacturers have provided new or remanufactured exchange cylinder assemblies as an overhaul kit for servicing an engine. Once the cylinder liner, piston and connecting rod to be replaced are removed from the engine, the cylinder assembly is installed as a unit within the cylinder bore. Such cylinder assemblies obviate the time consuming operation of individually assembling the component parts on the engine.

As disclosed in U.S. Pat. No. 4,480,368 dated Nov. 6, 1984, one of the known devices for retaining the component parts of the assembly in the assembled position during installation includes inserting a plastic cup-shaped member into the cylinder liner. The cup-shaped member seals against the liner and creates a vacuum for preventing the piston from sliding out of the liner. However, that arrangement is useful primarily for cylinder assemblies of smaller engines wherein the cylinder assembly can be readily lifted by the mechanic without the aid of a mechanical hoist. One of the problems in applying this cylinder assembly concept to the larger engines is that the assembly would be too heavy for the mechanic to manually lift and install within the cylinder bore. As an example, the combined weight of the cylinder liner, piston, and connecting rod on some large engines can easily exceed 400 to 500 pounds such that a hoist would necessarily be required for lifting and subsequently lowering the cylinder assembly into the cylinder bore. Thus a separate device would be required for attachment to the cylinder liner so that the assembly could be raised and subsequently lowered into the cylinder bore with a hoist. Further, the combined weight of the piston and connecting rod assembly would be of a magnitude that one could not reliably depend on retaining the piston within the liner simply with a vacuum.

Another known device for retaining the cylinder assembly together uses a pivoted clamp to engage beneath a radially extending flange of the cylinder liner. The piston is then retained by a plurality of set screws threaded through the clamp and frictionally engage the outer surface of the piston. One of the problems associated with that device, when used on cylinder assemblies for large engines, is that the piston could be damaged by the set screws when the set screws are tightened sufficiently to support the combined weight of the piston and connecting rod.

The present invention is directed to overcoming one or more of the problems as set forth above.

DISCLOSURE OF THE INVENTION

In one aspect of the present invention, an apparatus adapted to package a cylinder liner, a piston, rings, and a connecting rod as an engine cylinder assembly for installation into a cylinder bore of an engine block as a unit is provided. The apparatus comprises a pair of liner engagement brackets adapted to positively grippingly engage the cylinder liner, means for releasably connecting the pair of brackets together, a lifting element, and means for releasably attaching the lifting element to the piston so that a portion of each bracket is sandwiched between the lifting element and the piston.

In another aspect of the present invention, a method of packaging a cylinder liner, a piston, rings, and a connecting rod as an engine cylinder assembly comprises the steps of assembling the cylinder liner, piston, rings and connecting rod into their operational relationship one with the other to form the assembly, positioning a pair of liner engagement brackets in positive gripping engagement with the cylinder liner, releasably connecting the pair of brackets together, and releasably attaching a lifting element to the piston so that a portion of each bracket is positioned between the lifting element and the piston.

The present invention provides an apparatus which can be used both for prepackaging a cylinder liner, a piston, rings, and a connecting rod into a cylinder assembly and for subsequently installing the cylinder assembly into a cylinder bore as a unit without damaging the piston or other components of the cylinder assembly. The apparatus positively grippingly engages the cylinder liner and is securely attached to the piston so that a hoist can be attached thereto for lifting the cylinder assembly and for subsequent lowering the cylinder assembly into the cylinder bore. Moreover, once the cylinder assembly is positioned within the bore sufficient for the cylinder liner to be supported by the engine block, the apparatus can be released from the cylinder liner while remaining attached to the piston so that the hoist can be used to lower the piston and rod assembly to a position wherein the connecting rod can be attached to the crankshaft.

BEST MODE FOR CARRYING OUT THE INVENTION

Figure 3:
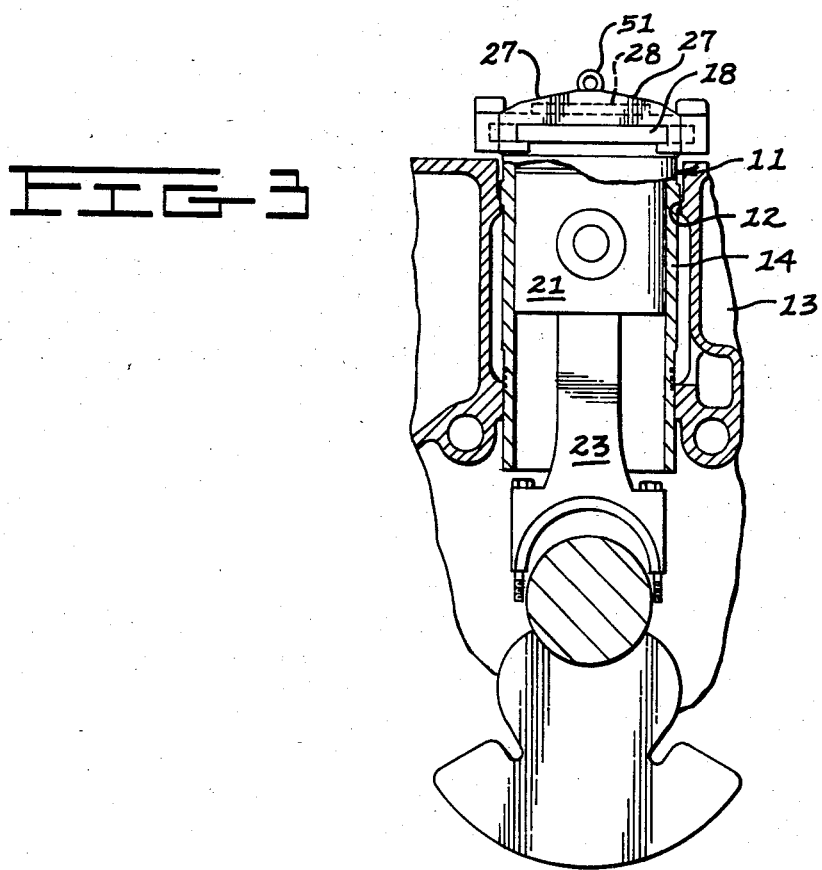
FIG. 3 is a view similar to FIG. 1 but showing the relationship of the present invention and a cylinder bore of an engine.

Referring now to the drawings, an apparatus 10 is shown for packaging a cylinder assembly 11 for subsequent installation into a cylinder bore 12 of an engine block partially shown at 13 in FIG. 3. The engine cylinder assembly includes a cylindrical cylinder liner 14 and a piston assembly 16 slidably positioned within the cylinder liner 14. The cylinder liner has a bore 17 extending therethrough and a radially outwardly extending flange 18 at one end thereof. A plurality of O-ring seals 19 are seated in appropriate annular grooves at the other end of the cylinder liner. The piston assembly 16 includes a piston 21, a plurality of rings 22 seated in appropriate grooves in the piston, and a connecting rod 23 pivotally connected to the piston by a wrist pin 24. The piston 21 has a pair of threaded holes 26 in the top surface thereof.

The apparatus 10 holds the cylinder liner 14 and piston assembly 16 together in the packaged engine cylinder assembly and includes a pair of liner engagement brackets 27 and a lifting element 28. The liner engagement brackets 27 are releasably connected together by a pair of threaded fastener means 29. The lifting element 28 is releasably attached to the piston 21 by a pair of bolts 31.

Each of the liner engagement brackets 27 has an outer arcuate edge 32, an inner edge 33, a lower surface 34 and an upper surface 36. The lower surfaces 36 of the brackets 27 are in engagement with the end of the cylinder liner 14. A radially inwardly extending lip 37 at the outer edge 32 is spaced from the lower surface 34 and is positioned beneath the flange 18 of the cylinder liner 14 and in contact with the cylindrical surface of the liner to provide positive gripping engagement between the bracket 27 and the cylinder liner 14. A pair of spaced apart lugs 38 extend upwardly from the upper surface 36 with each lug having a hole 39 extending therethrough perpendicular to the inner edge 33. Each of the brackets 27 also has a slot 41 opening at the inner edge, a threaded hole 43, a lug 44 extending upwardly from the upper surface 36 adjacent the outer edge, and a hole 46 extending through the lug substantially parallel to the upper surface 36.

The threaded fastener means 29 in this embodiment includes a pair of bolts 47 individually extending through the aligned holes 39 in the lugs 38 and a pair of nuts 48 threaded onto the bolts.

The lifting element 28 has a pair of holes 49 extending therethrough. The bolts 31 extend through the holes 49 in the lifting element, the slots 41 in the brackets 27 and thread into the threaded holes 26 in the piston 21. A lifting eye 51 is connected to the lifting element 28.

Industrial Applicability

Figure 1:
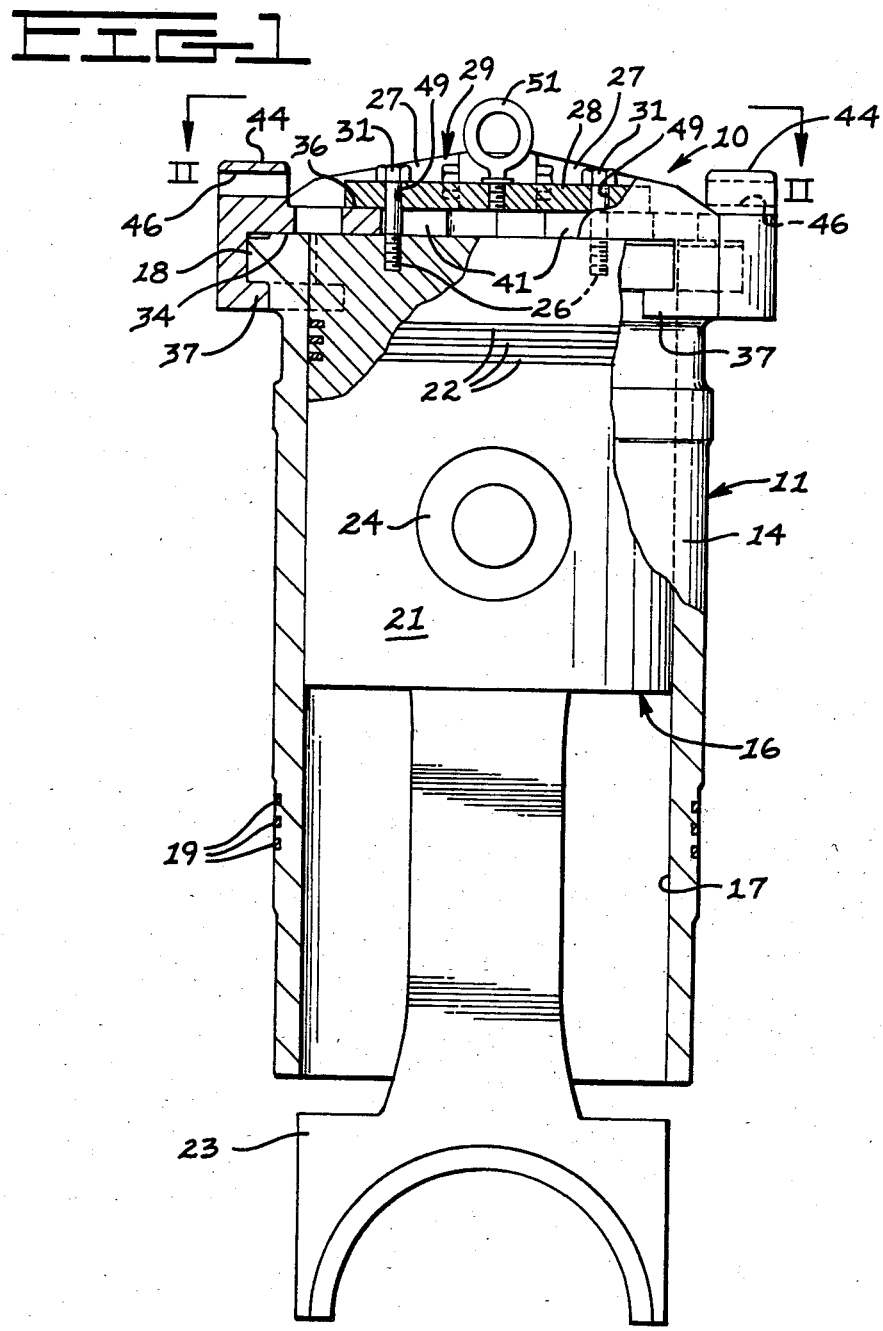
FIG. 1 is a longitudinal sectional view of an embodiment of the present invention.
Figure 2:
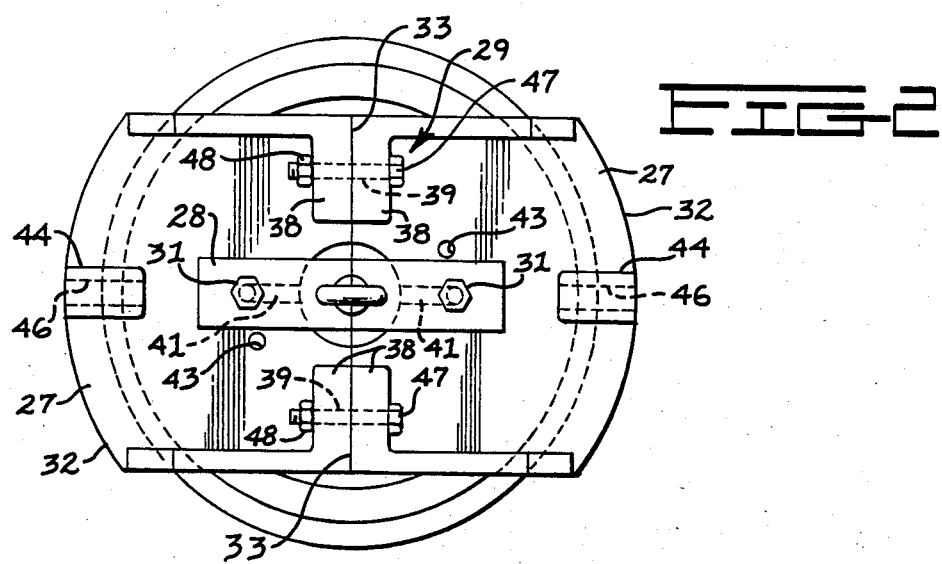
FIG. 2 is top plan view of the embodiment of FIG. 1.

The above-described apparatus 10 is used in the method of packaging the cylinder liner 14, the piston 21, rings 22 and connecting rod 23 as the engine cylinder assembly 18. The method generally includes assembling the component parts of the assembly together substantially as shown in FIG. 1. The liner engagement brackets 27 are then positioned on the flange end of the cylinder liner 14 and moved toward one another until the inner edges 33 are in abutment with each other and the lips 37 are beneath the flange 18 and in engagement with the cylindrical surface of the liner 14. The bolts 47 are then inserted through the holes 39 and the nuts 48 threaded thereon to clamp the brackets 27 together. The lifting element 28 is then attached to the piston 21 with the bolts 31 wherein a portion of the brackets 27 are sandwiched between the lifting element and the piston and the piston is securely clamped against the lower surfaces 36 of the brackets 27.

To install the engine cylinder assembly 11 in the cylinder bore 12, a hoist (not shown) is connected to the lifting eye 51 to raise and otherwise manipulate the engine cylinder assembly to a location above the cylinder bore. The engine cylinder assembly is then lowered into the bore as a unit. When the cylinder liner 14 reaches the position shown in FIG. 3, frictional contact between the O-ring seals 19 and the wall of the bore is generally sufficient to support the weight of the engine cylinder assembly. The bolts 31 are then loosened slightly, the bolts and nuts 47,48 removed, and the brackets 27 separated from their engagement with each other and the cylinder liner. The hoist can then be employed to lower the piston assembly 16 relative to the cylinder liner 14 to a position at which the connecting rod is attached to the crankshaft of the engine. The bolts 31 are then removed to detach the lifting element from the piston.

The method steps specifically include assembling the cylinder liner 14, the piston 21, rings 22 and the connecting rod 23 into their operational relationship one with the other to form the assembly, positioning the pair of liner engagement brackets 27 in positive gripping engagement with the cylinder liner 14, releasably connecting the pair of brackets 27 together, and releasably attaching the lifting element 28 to the piston so that a portion of each bracket is positioned between the lifting element and the piston. The positioning step includes the steps of moving the brackets toward each other and positioning a radially inwardly extending lip 37 beneath the radially outwardly extending flange 18 of the cylinder liner 14. The connecting step includes the step of clamping the abutting edges 37 of the brackets together with a threaded fastener means 29. The attaching step includes the step of inserting the bolts 31 through the holes 49 in the lifting element 28 and threadably engaging the threaded holes 26 in the piston. The attaching step further includes tightening the bolts 31 sufficiently to clamp the portion of the brackets between the lifting element and the piston.

The method of installing the packaged engine cylinder assembly 11 into the cylinder bore 12 of the engine block 13 includes the steps of inserting the assembly into the cylinder bore 12, disconnecting the pair of brackets from each other, separating the brackets to release the positive gripping engagement with the cylinder liner and to move the portion of the brackets from between the lifting element and the piston, lowering the lifting element and thus the piston relative to the cylinder liner to a position at which the connecting rod 23 can be connected to the crankshaft, and detaching the lifting element 28 from the piston.

In some V-type engines, the cylinder bore 12 is angled slightly relative to the vertical. Under this condition, a suitable bar can be inserted into the hole 46 in the lug 44 to tilt the engine cylinder assembly 11 to an angle substantially matching the angle of the bore. The engine cylinder assembly 11 is then lowered into the bore while the engine cylinder assembly is maintained at the appropriate angle.

The apparatus 10 can also be used to remove the cylinder liner 14 from the bore once the cylinder liner is raised sufficiently to release the frictional contact between the O-ring seals and the bore. For this operation, the brackets 27 are connected together as previously described with the lip 37 engaging the flange 18 of the cylinder liner. However, the lifting element 28 is connected to the brackets 27 by suitable bolts extending through the holes 49 and threaded into the threaded holes 43.

In view of the foregoing, it is readily apparent that the structure of the present invention provides an improved apparatus for packaging a cylinder liner, a piston, rings and a connecting rod as an engine cylinder assembly for installation into a cylinder bore of an engine block as a unit. More specifically, the lips of the brackets engage beneath the flange of the cylinder liner to positively grippingly engage the cylinder liner. Likewise, the lifting element is positively attached to the piston by bolts threaded into threaded holes of the piston thereby clamping a portion of the bracket between the lifting element and the piston. The apparatus does not rely on any frictional engagement between the apparatus and the elements.

Other aspects, objects and advantages will become apparent from a study of the specification, drawings and appended claims.

I claim:

1. An apparatus adapted to package a cylinder liner, a piston, rings and a connecting rod as an engine cylinder assembly for installation into a cylinder bore of an engine block as a unit comprising:

a pair of liner engagement brackets each having a lip adapted to positively grippingly engage a radially outwardly extruding flange at one end of the cylinder liner;

means for releasably connecting the pair of brackets together;

a lifting element;

means for releasably attaching the lifting element to the piston so that a portion of each bracket is sandwiched between the lifting element and the piston; and a hole in said lifting element, including a bolt extending through the hole in the lifting element and adapted to be threaded into a threaded hole in the piston.

2. A method of packaging a cylinder liner, a piston, rings, and a connecting rod as an engine cylinder assembly comprising the steps of:

assembling the cylinder liner, the piston, rings, and the connecting rod into their operational relationship one with the other to form the assembly;

positioning a pair of liner engagement brackets in positive gripping engagement with the cylinder liner;

releasably connecting the pair of brackets together; and releasably attaching a lifting element to the piston so that a portion of each bracket is sandwiched between the lifting element and the piston.

3. The method, as set forth in claim 2, wherein the positioning step includes the steps of moving the brackets toward each other and positioning a radially inwardly extending lip of each bracket beneath a radially outwardly extending flange on the cylinder liner.

4. The method, as set forth in claim 3, wherein the connecting step includes the step of clamping the abutting edges of the brackets together with a threaded fastener means.

5. The method, as set forth in claim 2, wherein said attaching step includes the step of inserting a bolt through a hole in the lifting element and threadably engaging a threaded hole in the piston.

6. The method, as set forth in claim 5, wherein the attaching step further includes tightening the bolt sufficiently to clamp said portion of the brackets between the lifting element and the piston.

7. A method of installing the packaged engine cylinder assembly of claim 2 into a cylinder bore of an engine block comprising the steps of:

inserting the assembly into the cylinder bore;

disconnecting the pair of brackets from each other;

separating the brackets to release the positive gripping engagement with the cylinder liner and to move the portion of the brackets from between the lifting element and the piston;

lowering the lifting element and thus the piston relative to the cylinder liner to a position at which the connecting rod can be connected to the crankshaft; and detaching the lifting element from the piston.

* * * * *